United States Patent
de la Cruz et al.

(10) Patent No.: US 9,549,016 B2
(45) Date of Patent: Jan. 17, 2017

(54) CONGESTION CONTROL FOR MEDIA FLOWS

(71) Applicant: CISCO TECHNOLOGY, INC., San Jose, CA (US)

(72) Inventors: Sergio Mena de la Cruz, Etoy (CH); Laura Toni, Lausanne (CH); Stefano D'Aronco, Cjavammes-pres-Renens (CH)

(73) Assignee: Cisco Technology, Inc., San Jose, CA (US)

( * ) Notice: Subject to any disclaimer, the term of this patent is extended or adjusted under 35 U.S.C. 154(b) by 218 days.

(21) Appl. No.: 14/461,907

(22) Filed: Aug. 18, 2014

(65) Prior Publication Data

US 2016/0050149 A1 Feb. 18, 2016

(51) Int. Cl.
| | | |
|---|---|---|
| H04L 29/06 | (2006.01) |
| H04L 12/26 | (2006.01) |
| H04L 12/891 | (2013.01) |
| H04L 12/853 | (2013.01) |
| H04L 12/825 | (2013.01) |
| H04L 12/841 | (2013.01) |

(52) U.S. Cl.
CPC .......... *H04L 65/80* (2013.01); *H04L 43/062* (2013.01); *H04L 43/0852* (2013.01); *H04L 47/2416* (2013.01); *H04L 47/26* (2013.01); *H04L 47/283* (2013.01); *H04L 47/41* (2013.01)

(58) Field of Classification Search
None
See application file for complete search history.

(56) References Cited

U.S. PATENT DOCUMENTS

| | | |
|---|---|---|
| 6,643,496 B1 | 11/2003 | Shimoyama et al. |
| 7,012,893 B2 | 3/2006 | Bahadiroglu |
| 7,342,880 B2 | 3/2008 | Yanagihara et al. |
| 7,543,073 B2 | 6/2009 | Chou et al. |
| 8,369,216 B2 | 2/2013 | Kan |
| 8,392,615 B2 | 3/2013 | Visharam et al. |
| 8,767,772 B2 | 7/2014 | Masputra et al. |
| 2008/0117930 A1 | 5/2008 | Chakareski et al. |
| 2010/0290343 A1* | 11/2010 | Tanaka ............... H04L 12/4645 370/235 |
| 2013/0201996 A1 | 8/2013 | Masputra et al. |

(Continued)

FOREIGN PATENT DOCUMENTS

EP 1232627 B1 7/2009

OTHER PUBLICATIONS

International Search Report dated Oct. 14, 2015 cited in Application No. PCT/US2015/044840, 10 pgs.

(Continued)

*Primary Examiner* — Christine Duong
(74) *Attorney, Agent, or Firm* — Merchant & Gould P.C.

(57) ABSTRACT

An apparatus can include a congestion controller at a source endpoint node of a network that is configured to send substantially real-time media data at a variable sending rate to another endpoint node via the network. The congestion controller can be configured to compute the sending rate as a function of a predetermined target delay and feedback from the other endpoint node that includes a receive delay time for packets of the substantially real-time media data to be received at the other endpoint node from the source endpoint node.

18 Claims, 5 Drawing Sheets

(56) References Cited

U.S. PATENT DOCUMENTS

2014/0016474 A1    1/2014  Beheshti-Zavareh et al.
2014/0071819 A1*   3/2014  Gopalan ............... H04W 28/14
                                                        370/230
2014/0156863 A1    6/2014  Gao et al.
2014/0161135 A1    6/2014  Acharya et al.

OTHER PUBLICATIONS

Andrews, Matthew, "Probabilistic End-to-End Delay Bounds for Earliest Deadline First Scheduling", IEEE INFOCOM, Copyright 2000; pp. 603-612.
Gettys, Jim, et al., "Acmqueue Bufferbloat: Dark Buffers in the Internet", Networks Publication, Copyright 2011, pp. 1-15.
FP Kelly, et al., "Rate Control for Communication Networks: Shadow Prices, Proportional Fairness and Stability", Paper from University of Cambridge, Nov. 1997, 16 pgs.

* cited by examiner

CONGESTION CONTROL FOR MEDIA FLOWS

TECHNICAL FIELD

This disclosure relates to congestion control for media flows.

BACKGROUND

In communication networks, network congestion can occur when a link or node is carrying so much data that its quality of service deteriorates. Effects of congestions can include, queuing delays and packet loss. As a further example, bufferbloat is a phenomenon in packet-switched networks, in which excess buffering of packets causes high latency. When a router device is configured to use excessively large buffers, even very high-speed networks can become practically unusable for many interactive applications such as voice calls, video conferencing, chat, and web surfing.

DESCRIPTION OF EXAMPLE EMBODIMENTS

Overview

In one example, an apparatus can include a congestion controller at a source endpoint node of a network that is configured to send substantially real-time media data at a variable sending rate to another endpoint node via the network. The congestion controller can be configured to compute the sending rate as a function of (i) a predetermined target delay and (ii) feedback from the other endpoint node that includes a receive delay time for packets of the substantially real-time media data to be received at the other endpoint node from the source endpoint node.

In yet another example, a system can include a source endpoint node comprising a congestion controller configured to send packets of media for a given media flow to a receive endpoint node via a network according to a sending rate. The congestion controller can determine the sending rate based on (i) a preconfigured target delay and (ii) feedback from the receive endpoint node that includes a receive delay time for receiving the packets of media at the receive endpoint node. The network can be configured to route the packets of media sent from the source endpoint node to the receive endpoint node. The receive endpoint node can include a feedback calculator configured to compute the feedback in response to the packets of media received from the source endpoint node.

In another example, a method can include receiving feedback data at a source endpoint node from at least another endpoint node, the feedback data indicating at least a receive delay time for receiving data packets from the source endpoint node at the at least another endpoint node. The method can also include computing a price function based on the received feedback and a predetermined target delay for packets provided from the source endpoint node to the at least another endpoint node. The method can also include computing a rate for sending the data packets from the source endpoint node to the at least another endpoint node.

Example Embodiments

This disclosure relates to congestion control for media flows, such as can include substantially real-time communications (e.g., telephony, video conferencing, instant messaging and the like). The congestion control operates to maintain throughput during bufferbloat conditions in the network. As an example, a congestion controller can be configured at a source endpoint node to set a rate for sending one or more media flows from the source endpoint node to at least one other node in a network. The media flows can correspond to substantially real-time communications, such as transmitted as Internet protocol (IP) packets via a transport layer protocol (e.g., User Datagram Protocol (UDP)). The congestion controller can determine a sending rate for each respective media flow as a function of a predetermined target delay (e.g., for packets sent in the media flow) in conjunction with feedback from each endpoint node receiving the media flow. The target delay can be programmable (e.g., by another application) to a value consistent with what the packet delay should be in normal (e.g., stable and non-bufferbloat) network conditions. The feedback for a given path of the media flow can include a delay time for the media flow (e.g., one or more media packets belonging to the media flow) to travel from the source endpoint node to a respective receiving endpoint node. In some examples, the feedback can also include a receiving rate at which the substantially real-time data is received at the other endpoint node (e.g., an amount of data received in a given time period). By implementing congestion control in this manner, at equilibrium, packet delay can approximate the predetermined target delay even in the presence of bufferbloat. Since the congestion controller is implemented in a distributed manner at the endpoints (e.g., without controlling buffering or queuing in network nodes), it can be implemented in the network to complement other congestion control and avoidance approaches, such as can be implemented in the network nodes (e.g., routers) between the endpoints of the media flow. As used herein, network congestion refers to a situation when a link or node along a path is carrying so much data that its quality of service (QoS) deteriorates below some threshold. Bufferbloat can be one cause of network congestion.

Figure 1:
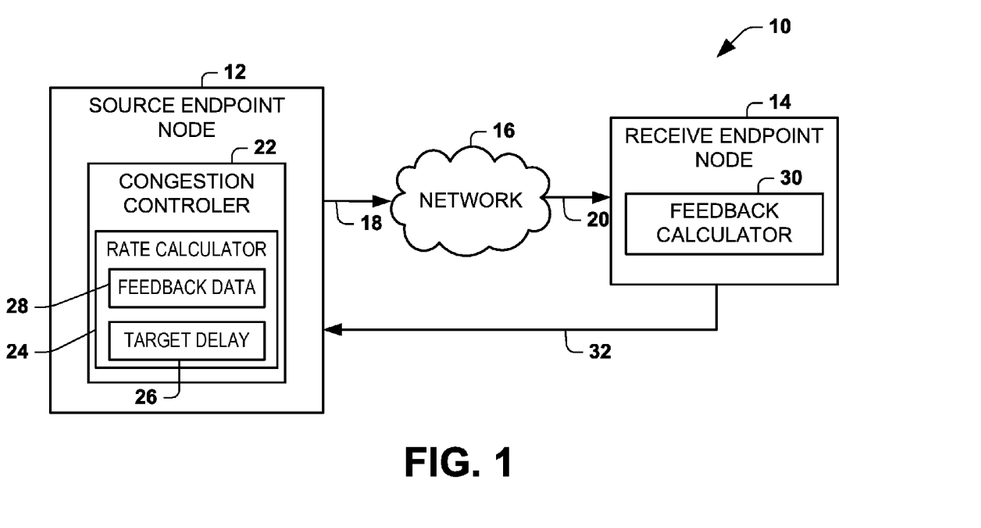
FIG. 1 illustrates an example of a system for implementing congestion control for media flows at a source endpoint.

FIG. 1 depicts an example of a network system 10 that includes endpoint nodes 12 and 14 and one or more network nodes, demonstrated at 16. In the example of FIG. 1, the node 12 is a source endpoint node and the node 14 is a receive endpoint node. Thus, for a given media flow of data packets in the system 10, the source endpoint node 12 sends the packets in a given media flow to the network nodes 16 via an interconnection link 18, and the receive endpoint node 14 receives the packets of the media flow via another link 20. It is to be appreciated that various types of hardware and/or software can be implemented as endpoint nodes, such as a desktop computer, a notebook computer, a tablet computer, smart phone, desk phone, video conferencing system, IP phone or the like. Nodes in the network 16 can be similarly interconnected by links (not shown). For example, the nodes in the network 16 can include an arrangement of layer-3 routing elements (e.g., routers) configured for packet forwarding and routing of data. Each of the links can have a fixed capacity (e.g., its bandwidth).

As an example, each endpoint node 12, 14 as well as nodes in the network 16 can include a respective interface to accommodate any number of interconnections to provide media flow paths from the node. While for simplicity of explanation, FIG. 1 demonstrates a single pair of endpoints 12 and 14, in other examples, there can be multiple pairs of active source/receive endpoints operating in the system 10 at any given moment. Each source endpoint thus can send media to one or more receive nodes via one or more paths. For example, the source endpoint node 12 generates encoded output media from its codec (e.g., audio and/or video codec's) which is converted into corresponding data packets (e.g., real time transport protocol (RTP) on top of UDP). Each of the nodes in the network 16 route the packets for a given media flow from the source node 12 to the receive node, such as according to a routing table used by routing logic.

The system 10 can include a congestion controller for each media flow that is provided from the nodes of the network 16. In the example of FIG. 1, for the media flow that is sent via links 18 and 20, the congestion controller 22 is implemented at the source endpoint node 12. The congestion controller 22 is configured to set the rate (e.g., bits per second (bps)) at which the source node 12 sends media via the link 18. For example, the source endpoint node 12 implements a codec for encoding the media for a given flow according to the rate established by the congestion controller 22. The congestion controller 22 thus includes a rate calculator 24 configured to compute the sending rate as a function of a predetermined target delay 26 and feedback data 28 associated with the media flow received by the receive endpoint node. The target delay should be set to a value that is greater than the propagation delay of data through the network, such as to represent a comfortable amount of delay for a given type of media flow during stable network conditions. Thus, the target delay can be set to a value that depends on the type of media being communicated between endpoints over a given media flow. For instance, instant messaging may have a longer acceptable amount of delay than voice or video conferencing. The feedback data 28 can represent a receive delay time period for packets of the media flow to travel from the source endpoint node 12 and to arrive at the receive endpoint node 14.

The congestion controller 22 can compute and update the sending rate periodically (e.g., at an update period) to facilitate adjustments to changing conditions of the network 16. In some examples, such as in response to detecting deteriorating network conditions, the update rate for computing the sending rate can be increased to faster rate. That is the update rate can be variable. Additionally, the source endpoint node 12 can include a separate instance of the congestion controller 22 to compute a respective sending rate for each path (e.g., one or more paths) that is being employed by the source endpoint node 12 for sending media to the receive node 14. The number and types of paths utilized for sending the media to the receive node 14 can be established during initialization of the communications session, for example. For instance, a communications session in the system 10 can include one or more one-way flows from the source endpoint 12 and the receive endpoint 14 and one or more other one-way flows from the receive endpoint (operating as a source) to the source endpoint (e.g., operating as a receiver). Each source endpoint can implement one or more instances of the congestion controller 22, as disclosed herein.

By way of example, congestion controller 22 can analyze the receive delay with respect to a target delay to calculate a corresponding price function for use in computing the rate for a given path. The feedback data 28 can also include a receiving rate at which the data packets for a given media flow are received at the receive endpoint node 14, such as corresponding to a number of bits received in a prescribed time period. For example, congestion controller 22 can calculate the price function based on a first component (e.g., a target price) corresponding to the receive delay with respect to the target delay 26 and based on a second component (e.g., a rate-equalizing price) corresponding to the receiving rate with respect to the sending rate. For instance, the target price can be determined based on a difference between an average receive delay for the receive endpoint node 14 and the predetermined target delay 26. The average receive delay can correspond to an average packet delay determined as a time period for packets to travel through the network from the source endpoint node 12 to the receive endpoint node 14. The rate equalizing price can be determined based on a difference between the sending rate and the receiving rate. The congestion controller 22 thus can employ the rate calculator 24 to compute a sending rate for packets of the media flow. The congestion controller 22 can update the sending rate, such as can be updated periodically or in response to detecting an event (e.g., a change in network conditions and/or receiving feedback from the receive endpoint node 14.

The receive endpoint node 14 can include a feedback calculator 30 configured to compute feedback information that is provided to the congestion controller 22 of the source endpoint node. The receive endpoint node 14 can provide the feedback to the source endpoint node via message, demonstrated schematically at 32, which may in-band or out-of-band for the media communication session between the endpoints 12 and 14. The feedback message 32 can be provided via a media flow from the receive endpoint node 14 to the source endpoint node 12. As another example, the feedback message can be provided from the receive endpoint node 14 to the source endpoint node 12 as part of statistics information associated with the communications session (e.g., via RTP control protocol (RTCP) or another signaling protocol, such as the session initiation protocol (SIP)).

Figure 2:
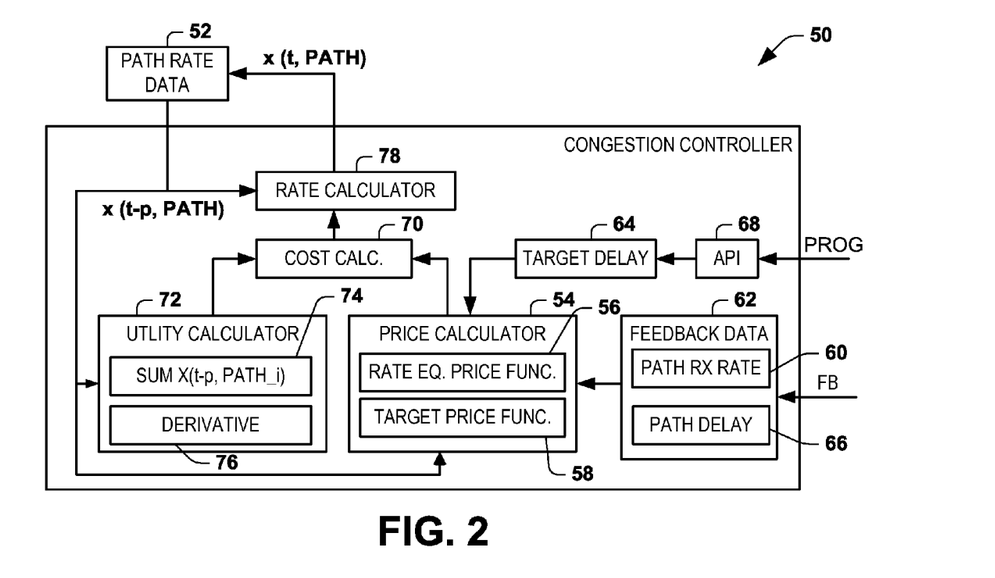
FIG. 2 illustrates an example of a congestion controller.
Figure 3:
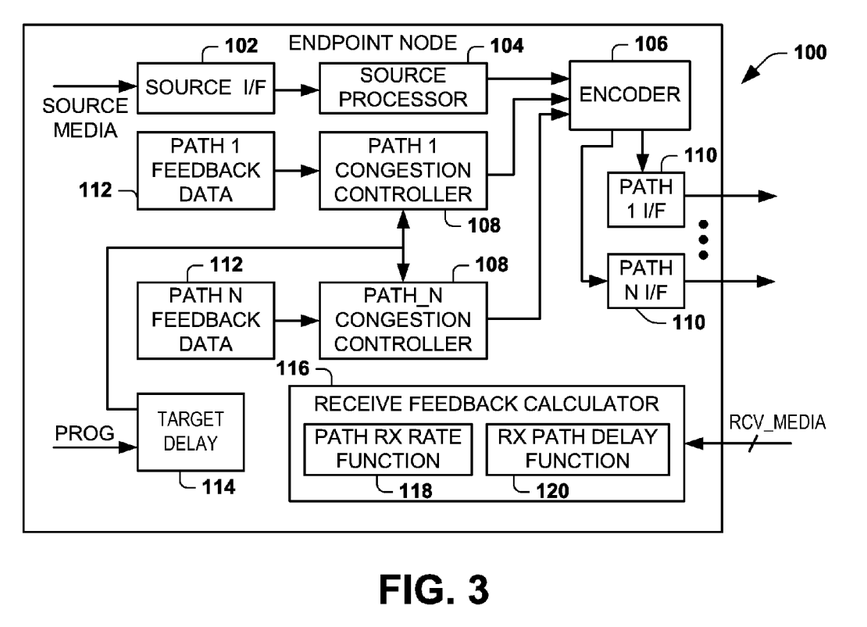
FIG. 3 illustrates an example of an endpoint node implementing a congestion controller.

FIG. 2 depicts an example of a congestion controller 50, which can correspond to the congestion controller 22 of FIG. 1 or congestion controllers 108 of FIG. 3. An instance of the congestion controller 50 can be implemented for each path that a given source endpoint node (e.g., node 12 of FIG. 1) utilizes for sending media to one or more receive endpoint nodes. Since different paths can impose different amounts of delay, a corresponding congestion controller can compute an appropriate rate for sending data packets from a source endpoint node to one or more receive endpoint nodes. In the example of FIG. 2, a corresponding sending rate for a given path can be stored as path rate data 52, such as in in memory of the apparatus corresponding to the source end point node. As mentioned, a sending rate, denoted x(t, PATH), can be computed for each path that is used to send media to each receive endpoint node in a communications session, where t is current time and PATH denotes the path for the corresponding media flow from the source endpoint node.

The congestion controller 50 includes a price calculator 54 programmed to compute one or more corresponding price functions. The price functions can vary over a time and thereby operate in the congestion controller 50 to reduce the sending rate, such as to prevent it from exceeding the capabilities of the network. In the example of FIG. 2, the price calculator 54 includes a rate equalizing function 56 and a target price function 58, each of which are programmed to compute different respective price components for a given path.

The rate equalizing price function 56 can be programmed to compute a price component based on the sending rate for a previous time period, x(t−p, PATH), where p denotes a given time period, and a path receive rate 60, which can be an average over time period p, and can be denoted x_rcv(p, PATH). As an example, the path receive rate (x_rcv(p, PATH)) 60 can be determined by each path used by the source endpoint node 12 for sending packets to the receive endpoint. The receive endpoint can track the total amount of bits received during a given time period and divide the number of bits divided by a difference between the time stamps for the first and last packets received during a given time period. In some examples, the sender node can send the computed receiving rate information as feedback data to the source endpoint node. In other examples, the respective first and last time stamp values can be sent as the feedback and the determination of the receive rate can be computed at the source endpoint node and stored as the path rate data 60.

As a further example, the rate equalizing price function 56 can compute the function (rate_equalizing_price(t, path)) 56 as follows:

$$\text{rate\_equalizing\_price}(t,\text{path})=[x(t-p,\text{path})-x\_rcv(p,\text{path})]/x(t-p,\text{path})$$

The path receive rate 60 thus can be part of feedback data 62. For example, the rate equalizing price function 56 will increase if the difference between the sending rate and receiving rate increases for the respective path. Such an increase can indicate that the sending node is sending at a rate that is too high for the network to absorb, and thus can result in buffers in the network filling up, potentially resulting in buffer bloat. Thus the price equalizing function can assess whether the network can or cannot adequately absorb and propagate the data at the current sending rate. As another example, the rate equalizing price for the path will be zero if the sending and receiving rates are equal (e.g., corresponding to stable buffers in the network).

The target price function 58 can be programmed to compute the target price as a function of the predetermined target delay (target_delay) 64 and a corresponding path delay 66. The path delay 66, for example, can correspond to an average delay that is computed to represent a time period [avg_delay(p, path)] for a set of data packets to be received by the receiving node over a given time period p for media data sent from the source endpoint node via the given path.

For example, the average packet delay avg_delay(p, path) provided by the path delay data 66 can encompass both propagation delay and queuing delay that exists in the network. The average packet delay avg_delay(p, path) can be determined based on comparing the time stamp of each outgoing packet from the source node relative to the time stamp at the receive endpoint node upon reception. This approach would assume that both endpoint nodes are synchronized, such as according to an NTP or other synchronization protocol. In another example, the average packet delay avg_delay(p, path) can be computed in response to the source endpoint node sending a probe request to the receive endpoint node to which the receive endpoint node responds immediately with an acknowledgement message. The source endpoint node can in turn estimate the average delay as corresponding to one-half the average round trip time (RTT) of the probes acknowledged during a given time period.

As an example the target price function 58 can compute the target price target_price(t, path) 58 over time for a given path as follows:

$$\text{target\_price}(t,\text{path})=[\text{avg\_delay}(p,\text{path})-\text{target\_delay}]/\text{avg\_delay}(p,\text{path})$$

The predetermined target delay 64 can be programmed by an application via a corresponding application interface (API 68). For example, in response to signaling performed for initiating a communications session between source and receive endpoints, a delay time (e.g., an average delay time) for transmission between such endpoint nodes can be measured. In other examples, the delay time can be known otherwise a priori. The measured delay time can be used to establish a corresponding target delay for packets that are transmitted from the source node to a given receive endpoint node. For example, the target delay should not be less than the propagation delay for data packets during stable (e.g., normal) network conditions. Thus, the target delay 64 can be set to a value corresponding to a delay time that is greater than such propagation delay. The target delay 64 can vary for a given type of media, such as mentioned above. As one example, a video conferencing application can preconfigure the target delay 64 via the API 68 to a set value (e.g., about 90 milliseconds) that is considered a comfortable amount of delay for video conferencing, provided that it exceeds the propagation delay through the network. If the desired target delay does not exceed the propagation delay through the network, by default, the congestion controller can set it to the propagation delay through the network or to some predetermined amount (e.g., 5 ms) greater than the propagation delay through the network.

As another example, the target price function will increase if the receiving endpoint node is experiencing an increase in its receive delay with respect to the predetermined target delay 64 over a given time period. The price calculator 54 can scale down the target price by a factor (beta) to help preserve long time stability of the congestion control process. By setting the target delay in the manner disclosed herein, the congestion controller 50 can operate to converge the delay value to approximate the target delay 64 provided, assuming that network conditions permit convergence. As an example, the price calculator 54 can compute the aggregate price (price(t, path)), such as follows:

$$\text{price}(t,\text{path})=\text{rate\_equalizing\_price}(t,\text{path})+\text{beta}*\text{target\_price}(t,\text{path})$$

The congestion controller 50 can implement a cost calculator 70 programmed to compute a cost value based on the price determined by the price calculator price(t, path) and based on a utility determined by a utility calculator 72. The utility calculator 72 can be programmed to compute a utility indicator U'(x_old) which can be correlated to the quality of the media that is sent from a source node to the endpoint node, where x_old denotes a sum of sending rates x(t−p, PATH) for all the paths used by the source endpoint node in a previous time period t−p. The utility indicator can depend on metrics (e.g., statistics) for the sending rate as well as on the content of the media being communicated. The cost calculator 70 balances the utility indicator with the price value by producing a cost function that facilitates maximizing a utility of the flow. The utility calculator 72 can compute the utility indicator U'(x_old) as a derivative of a utility function U(x_old) and has a corresponding endpoint to the cost calculator 70. Since x_old denotes a sum of sending rates x(t-p, PATH) for all the paths used by the source endpoint node, the utility calculator computes the derivative of the utility function to provide an assessment of the whole media flow provided by the source endpoint node to a given receive endpoint node. Thus, in contrast to the price function, which relates to price associated with each path individually, the utility function assesses the utility for the overall one-way communication from the source to the receive endpoint node.

In the example of FIG. 2 the utility calculator 72 includes a summation component 74 representing a summation of the sending rate over each of a plurality of paths (path_i), where i is integer denoting the number of paths in the network. For example, the summation component 74 can sum the sending rate for all of the paths used by the source endpoint node for example. The utility function, in some examples, can be represented as being log of the rate (log x(t)), in which the derivative function 76 can compute the derivative of the utility function to correspond to 1/(x_old). The cost calculator 70 thus can compute a corresponding cost based on the difference between the utility derivative and the price, such as follows:

$$\mathrm{cost}(t,\mathrm{PATH}) = U'(x\_old) * \mathrm{rateIncreasePriceZero} - \mathrm{price}(t-p,\mathrm{path})$$

wherein rateIncreasePriceZero can denote a maximum variation in the rate for the given time period p (e.g., rateIncreasePriceZero≈1)

The congestion controller 50 can include a rate calculator 78 to, in turn, compute a rate for a given path based on the cost calculated and the computed sending rate for at least one previous time period. As one example, the rate x(t, PATH) can be computed by the rate calculator 78 as follows:

$$x(t,\mathrm{path}) = x(t-p,\mathrm{path}) + k * x(t-p,\mathrm{path}) * [\mathrm{cost}(t,\mathrm{PATH})]$$

From the foregoing, it is demonstrated that the rate computed for a given path (i.e., x(t, path)) includes the independent component associated with the delay and rate associated with each path independently as well as another part where the utility is assessed for all paths combined. Additionally, since the congestion controller 50 does not depend exclusively on packet losses as feedback, as in some existing congestion control algorithms, the controller can mitigate congestion in bufferbloat conditions (excess of buffer space in routers). Moreover, deployment of the congestion controller 50 can be facilitated since it is distributed to the endpoint nodes and does not have to be implemented in intermediate nodes (e.g., routers) along the path in the network. As a result, the congestion controller also can effectively mitigate bufferbloat conditions in circumstances where there is no control over the network nodes (e.g., where bufferbloat itself cannot be directly addressed). In other situations where there may be control over the network nodes, the congestion controller 50 disclosed herein can operate in combination with other congestion control algorithms in a complementary manner to further mitigate congestion.

FIG. 3 depicts an example of a source endpoint node 100 to demonstrate a scenario where the endpoint node is configured to provide media data to another endpoint via multiple paths. For example, the endpoint node 100 can include a source interface 102 that is configured to receive source media from an endpoint device. For example, the source interface 102 can receive audio, video, a combination of audio and video as well as other forms of data via one or more corresponding input devices coupled to the source interface. The source interface 102 provides the input source media to the source processor 104.

The source processor 104 can process the received source media into an appropriate format of digital data, such as can include providing digital streams of source media data for one or more paths according to application requirements. In the example of FIG. 3, the source processor 104 generates a corresponding stream of digital data that can be distributed over one or more of N paths, where N is a positive integer denoting the number of paths for communicating media data from the node 100. An encoder 106 is configured to provide encoded packets of media data to a respective path interface 110. For example, the encoder 106 is programmed to according to one or more Codec's for encoding the digital stream of data for a respective path at rate (e.g., bitrate and resolution) based upon a rate computed by an associated instance of a congestion controller 108 for the respective path. As disclosed herein, an instance of the congestion controller 108 can be implemented for each of the N paths. Each instance of the congestion controller 108 can compute the rate based on the path data 112 representing feedback from a received endpoint node and a preconfigured target delay 114, such as disclosed herein. It is understood that the preconfigured target delay 114 can be the same for each respective path to facilitate synchronization of multipath data from a sender to a respective endpoint node.

The encoded stream for each path can be in turn propagated to a network via a corresponding path interface 110. Each path interface 110 thus can be coupled to the network via a corresponding communication link. Each path interface 110 can thus provide a physical layer for communicating a respective flow of media data to the network. For example, the path interface 110 can provide a physical connection (e.g., electrically conductive link optical fiber link) or a wireless connection (e.g., radio frequency WiFi, WiMax or the like) for communicating media data to the endpoint node via a respective path through the network.

The endpoint node 100 can also include a receive feedback calculator 116 that is configured to compute feedback based upon media flow data (RCV_MEDIA) received from one or more other endpoint node. For instance, the other endpoint node can correspond to the endpoint to which the node 100 sends its media flow via path interfaces 110. The receive feedback calculator 116 thus can compute feedback (e.g., statistics) based on the media received from such other endpoint node and in turn send the feedback to the other endpoint node—similar to the feedback that the node 100 receives from the other endpoint node but in response to a media flow received from the other endpoint. Thus as demonstrated, the receive feedback calculator 116 includes a path receive rate function 118 and a receive path delay function 120. For example, the path receive rate function 118 can determine a rate (e.g., the x_rcv(p, PATH)) that data is received from the other endpoint for a given path (PATH) over a corresponding time period p, such as disclosed herein. The receive path delay function 120 can determine an average delay (e.g., avg_delay(p, path)) representing a time period for a set of data packets to be received by the receiving node over a given time period p, such as disclosed herein.

The node 100 can provide the feedback information (e.g., path rate and path delay data) in the media flow that is provided by one or more of the path interfaces 110. Alternatively, the endpoint node 100 can send the feedback information to the other endpoint node via other communications, such as via a messaging or signaling protocol (e.g., RTCP messaging or the like).

Figure 4:
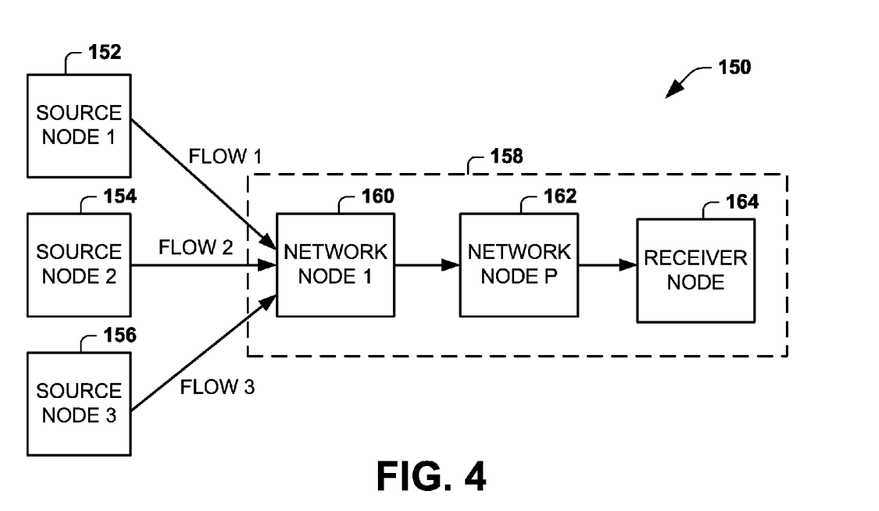
FIG. 4 illustrates an example simplified block diagram of a network and an associated media flow.

FIG. 4 depicts an example of a topology for a network system 150 that includes a plurality of source endpoint nodes 152, 154 and 156 that each provide respective media flows, demonstrated as flow 1, flow 2, and flow 3, to a corresponding network 158. In particular, each of the source nodes 152, 154 and 156 provides its respective flows to a corresponding network node 160. The network node 160 can employ a routing algorithm to, in turn, route the data packets for each of the respective flows to one or more other network nodes 162 implemented within the network 158. Each of the network nodes can be implemented as a router that implements very long buffers, which can create a bottleneck link for the flows. Thus, the flows share the bottleneck link provided by the node 160 and the node 162, and thus can compete for resources. The capacity of the bottleneck can be fixed to a bandwidth capacity and the path have a corresponding propagation delay. The network node 162 in turn provides the respective flows to a receiver endpoint node 164. While three source endpoint nodes are demonstrated in this example, there can and typically be any number of more (or even fewer) nodes.

Figure 5:
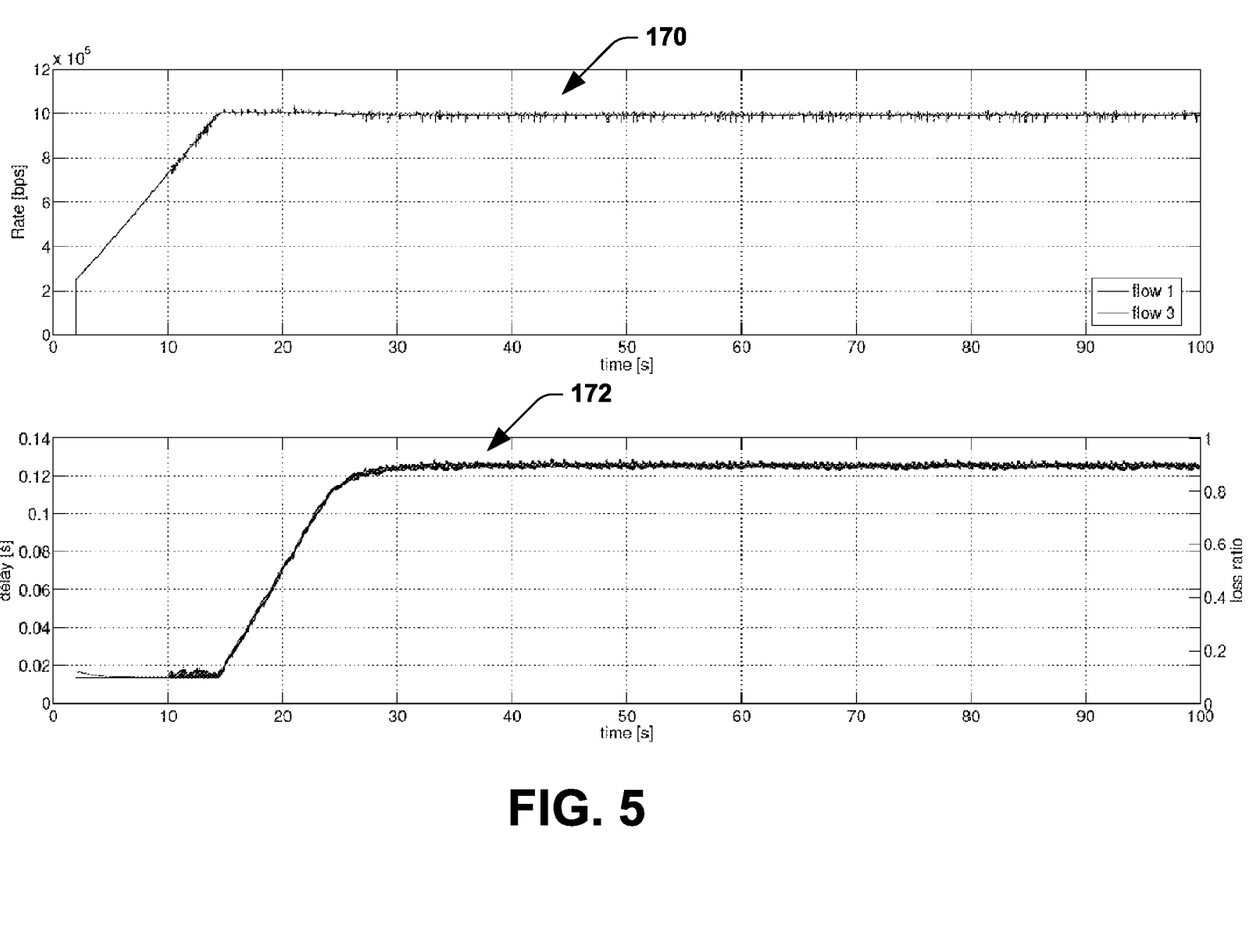
FIG. 5 depicts plots of rate and delay for a first example of media flows through the network of FIG. 4.
Figure 6:
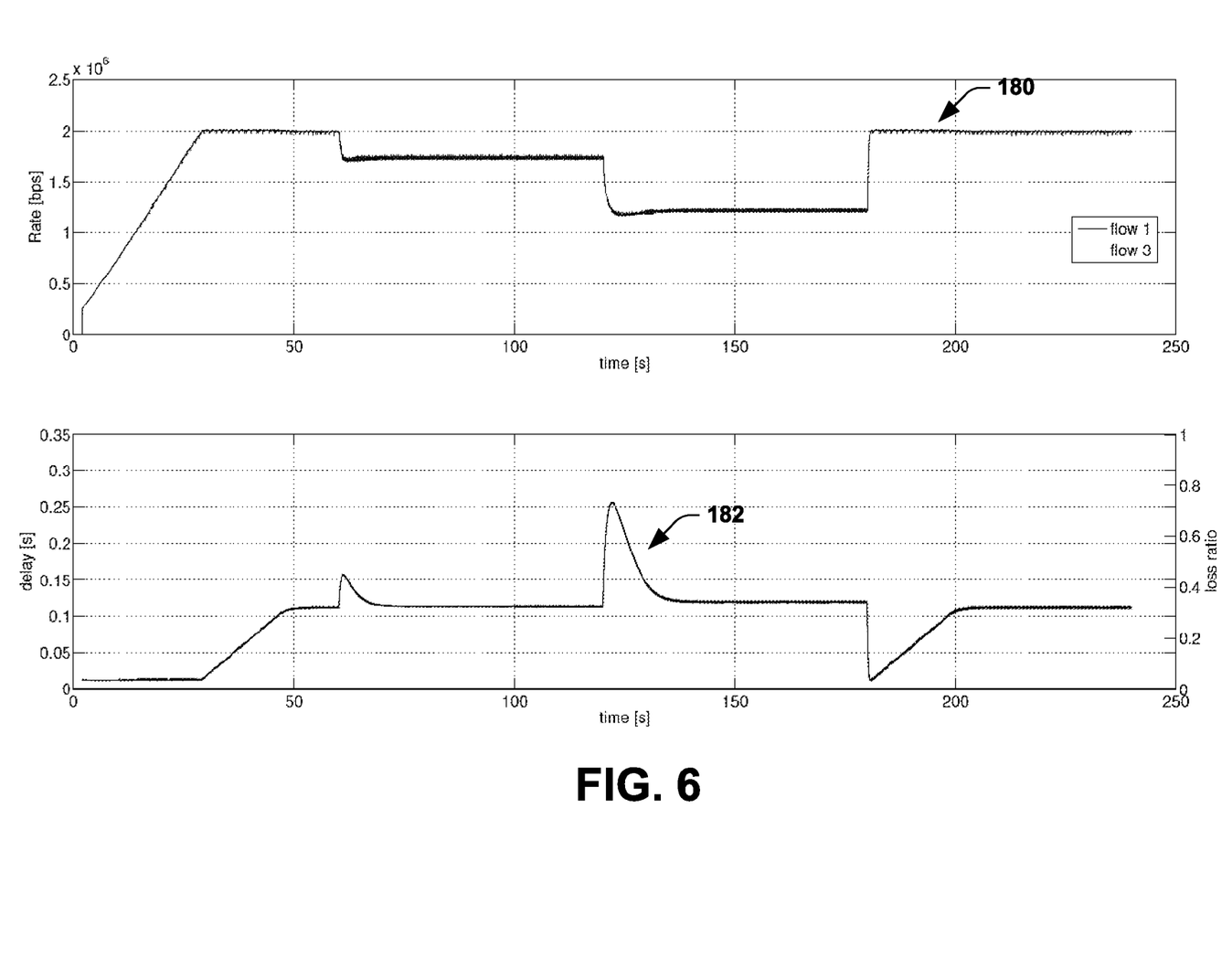
FIG. 6 depicts plots of rate and delay for another example of media flows through the network of FIG. 4.

FIGS. 5 and 6 demonstrate simulation results for the example system topology of FIG. 4 in different operating conditions. In the example of FIG. 5, the system is configured such that the source endpoint nodes 152 and 156 implement congestion controllers (see, e.g., FIGS. 1, 2 and 3 disclosed herein) to provide respective flows (e.g., flow 1 and flow 3) with a sender rate as disclosed herein. The other node 154 provides a fixed-rate UDP flow. In this example, the capacity of the bottleneck link at node 160 is set to a predetermined rate (e.g., about 2.5 Mbps) with a one way propagation delay of about 10 ms. The node 154 provides the UDP traffic at a constant rate of 500 kbps, and thus acts as background traffic for the other flows (flow 1 and flow 3). In this example, the target delay for flows 1 and 3 has been set to 100 ms. As demonstrated in FIG. 5 in plot 170, the sender rates of two flows from nodes 152 and 156 can increase from start up and then converge to an equal sender rate of about 1 Mbps. Both flows 1 and 3, together with the UDP flow, fully utilize the bottleneck link's capacity (e.g., 250 Mbps). Additionally as shown by plot 172 the delay (e.g., computed from feedback from the receiver node 164) for each of the flows increases and stabilizes at about 120 ms, which is about 20% greater than the target delay in this example.

In the example of FIG. 6, the plots demonstrate simulation results for same example system 150 of FIG. 4 but in different operating conditions, namely where the capacity of the bottleneck link is now set to 4.5 Mbps and the rate of the UDP flow is varying over time. For example, at about t=60 seconds, the UDP rate varies from 500 kbps to 1 Mbps, then at about t=120 seconds it changes to 2 Mbps, finally at about t=180 seconds it goes back to 500 kbps. As shown in FIG. 6, plot 180 demonstrates that the two flows running instances of the congestion controller utilize the available bandwidth completely. Additionally, the one-way delay demonstrated by plot 182 for each of the flows 1 and 3 further approximate the target value after slight deviations to changing network conditions.

Figure 7:
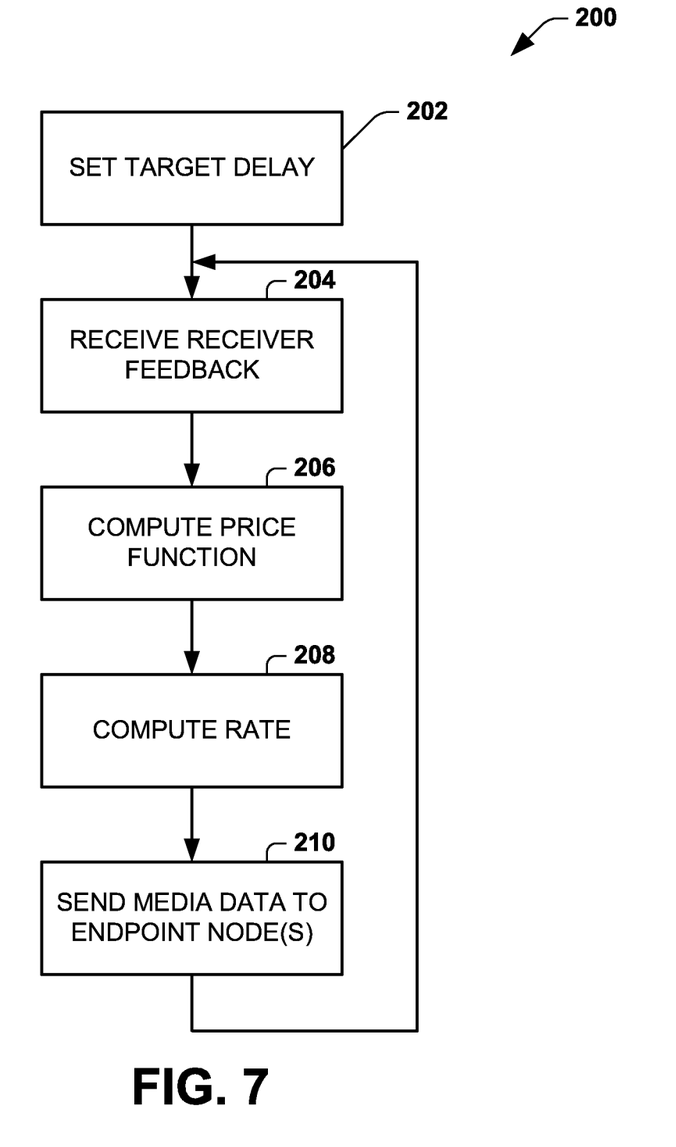
FIG. 7 is a flowchart illustrating an example method for controlling congestion.

In view of the foregoing structural and functional features described above, example methods will be better appreciated with reference to FIG. 7. While, for purposes of simplicity of explanation, the example method of FIG. 7 is shown and described as executing serially, it is to be understood and appreciated that the present examples are not limited by the illustrated order, as some actions could in other examples be repeated, occur in different orders and/or concurrently from that shown and described herein. Moreover, it is not necessary that all described actions be performed to implement a method. The method 200 can be implemented as instructions stored in one or more non-transitory computer readable medium, which can be executed by one or more processing resources (e.g., central processing units).

FIG. 7 is a flow diagram illustrating an example of a method 200 of congestion control that can be implemented in a network. The method begins at 202 in which a target delay (e.g., target delay 26, target delay 64 or target delay 114) is set for a source endpoint node (e.g., node 12 or 100). The target delay can be a preconfigured target delay for communicating data packets from a sender endpoint to a receive endpoint in a corresponding network. At 204, feedback (e.g., feedback data 28, 62 or 112) can be received at the source endpoint node from the receiver node. The feedback can include receive delay information, such as corresponding to an average delay of data packets received at a receiver for a given media path, as disclosed herein. The feedback can also include received rate information, such as corresponding to a number of bits received during a predetermined time period. As mentioned there can be any number of media paths, and feedback can be received at 204 for each such path.

At 206, a price function is computed (e.g., by congestion controller 22, 50 or 108; and/or by price calculator 54). The price function can include a target price that is calculated as a function of received delay feedback and the preconfigured target delay. In some examples, the price function can also include the rate equalizing price for each path such as disclosed herein. At 208, a sending rate is computed (e.g., by rate calculator 24 or 78) based on the price function and a utility metric, which can be determined (e.g., by utility calculator 72) according to the derivative of a utility function, such as disclosed herein. At 210, media data can be sent via a respective path based upon the path rate computed at 208. From 210 the method can return to 204 to repeat computing the rate based upon current feedback for a next update period.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. An apparatus comprising:
  a source endpoint node of a network;
  a congestion controller, at the source endpoint node of the network, that is configured to send substantially real-time media data at a variable sending rate to an other endpoint node via the network, the congestion controller being configured to compute the sending rate as a function of (i) a predetermined target delay and (ii) feedback from the other endpoint node that includes a receive delay time for packets of the substantially real-time media data to be received at the other endpoint node from the source endpoint node wherein the substantially real-time media data is sent from the source endpoint node to the other endpoint node via a plurality of paths, the apparatus further comprising an instance of the congestion controller to compute a corresponding sending rate for a respective one of the plurality of paths;

wherein each instance of the congestion controller is configured to compute the corresponding sending rate according to a price function computed for the respective path based on corresponding feedback received for the respective path and the predetermined target delay; and wherein each instance of the congestion controller further comprises, a corresponding utility component calculator configured to compute an aggregate measure of utility for the sending rate used for each of the plurality of paths, and a cost function to combine the aggregate measure of utility and the price function computed for the respective path, each instance of the congestion controller further configured to compute an updated sending rate for each path based on the cost function computed for the respective path and a previous sending rate for the respective path.

2. The apparatus of claim 1, wherein the price function includes a sum of a rate equalizing price and a target price, the rate equalizing price being determined based on a difference between a sending rate for the packets sent from the source endpoint node and a receiving rate for the packets of the substantially real-time media data received at a receive endpoint node, and the target price being determined based on a difference between the predetermined target delay and the receive delay time.

3. The apparatus of claim 2, wherein the receive delay time comprises an average packet delay over a time period for the packets of the substantially real-time data to travel through the network from the source endpoint node to the other endpoint node.

4. The apparatus of claim 2, wherein the receiving rate comprises a rate at which data is received by the other endpoint node over a time period.

5. The apparatus of claim 1, further comprising a plurality of path interfaces, each path interface configured to provide a respective media flow corresponding to a portion of the substantially real-time media data via a respective one of the plurality of paths through the network.

6. The apparatus of claim 1, wherein the apparatus further comprises an encoder configured to encode input media received from an input source based on the sending rate provided by the congestion controller such that the substantially real-time media comprises encoded packets of the input media.

7. A system, comprising:

a source endpoint node comprising a congestion controller configured to send packets of media for a given media flow to a receive endpoint node via a network according to a sending rate, the congestion controller to determine the sending rate based on (i) a preconfigured target delay and (ii) feedback from the receive endpoint node that includes a receive delay time for receiving the packets of media at the receive endpoint node;

the network being configured to route the packets of media sent from the source endpoint node to the receive endpoint node;

the receive endpoint node comprising a feedback calculator configured to compute the feedback in response to the packets of media received from the source endpoint node;

wherein the source endpoint node includes an instance of the congestion controller to compute a corresponding sending rate for a respective one of the plurality of paths via which the source endpoint node provides the packets of the given media flow to the network;

wherein each instance of the congestion controller is configured to compute the corresponding sending rate according to a respective price function computed for the respective path based on (i) the predetermined target delay and (ii) feedback received from the receive endpoint node for the respective path;

wherein each instance of the congestion controller further comprises a corresponding utility component calculator configured to compute a measure of aggregate utility for the sending rate used for each of the plurality of paths; and wherein each instance of the congestion controller further comprises a cost function to combine the measure of aggregate utility and the price function computed for the respective path, each instance of the congestion controller further computing an updated sending rate for the respective path based on the cost function for the respective path and a previous sending rate for the respective path.

8. The system of claim 7, wherein the congestion controller further comprises a price calculator configured to compute the price function that includes a rate equalizing price function and target price function, the rate equalizing price function being determined based on a difference between a sending rate for packets of the given media flow sent from the source endpoint node and a receiving rate for the packets of media received at the receive endpoint node, and the target price function being determined based on a difference between the preconfigured target delay and the receive delay time.

9. The system of claim 8, wherein the receive delay time comprises an average packet delay over a time period for the packets of media to travel through the network from the source endpoint node to the receive endpoint node.

10. The system of claim 8, wherein the receiving rate comprises a rate at which data is received by the receive endpoint node over a time period.

11. The system of claim 9, wherein the source endpoint node further comprises an encoder configured to encode input media received from an input source based on the sending rate provided by the congestion controller such that the source endpoint node provides the packets of media as encoded packets of the input media.

12. The system of claim 9, wherein the congestion controller further comprises an application interface to set the preconfigured target delay.

13. A method, comprising:

sending, by a source endpoint node comprising a congestion controller, packets of media for a given media flow to a receive endpoint node via a network according to a sending rate, the congestion controller to determine the sending rate based on (i) a preconfigured target delay and (ii) feedback from the receive endpoint node that includes a receive delay time for receiving the packets of media at the receive endpoint node;

routing, by the network, the packets of media sent from the source endpoint node to the receive endpoint node;

computing, by a feedback calculator in the receive endpoint node, the feedback in response to the packets of media received from the source endpoint node;

wherein the source endpoint node includes an instance of the congestion controller to compute a corresponding sending rate for a respective one of the plurality of paths via which the source endpoint node provides the packets of the given media flow to the network;

wherein each instance of the congestion controller is configured to compute the corresponding sending rate according to a respective price function computed for the respective path based on (i) the predetermined target delay and (ii) feedback received from the receive endpoint node for the respective path;

wherein each instance of the congestion controller further comprises a corresponding utility component calculator configured to compute a measure of aggregate utility for the sending rate used for each of the plurality of paths; and wherein each instance of the congestion controller further comprises a cost function to combine the measure of aggregate utility and the price function computed for the respective path, each instance of the congestion controller further computing an updated sending rate for the respective path based on the cost function for the respective path and a previous sending rate for the respective path.

14. The method of claim 13, further comprising computing, by a price calculator in the congestion controller, the price function that includes a rate equalizing price function and target price function, the rate equalizing price function being determined based on a difference between a sending rate for packets of the given media flow sent from the source endpoint node and a receiving rate for the packets of media received at the receive endpoint node, and the target price function being determined based on a difference between the preconfigured target delay and the receive delay time.

15. The method of claim 14, wherein the receive delay time comprises an average packet delay over a time period for the packets of media to travel through the network from the source endpoint node to the receive endpoint node.

16. The method of claim 14, wherein the receiving rate comprises a rate at which data is received by the receive endpoint node over a time period.

17. The method of claim 13, further comprising encoding, by an encoder in the source endpoint node, input media received from an input source based on the sending rate provided by the congestion controller such that the source endpoint node provides the packets of media as encoded packets of the input media.

18. The method of claim 13, further comprising setting, by an application interface in the congestion controller, the preconfigured target delay.

* * * * *